ically spaced loader arms 30, each of which is pivoted
United States Patent Office 3,282,453
Patented Nov. 1, 1966

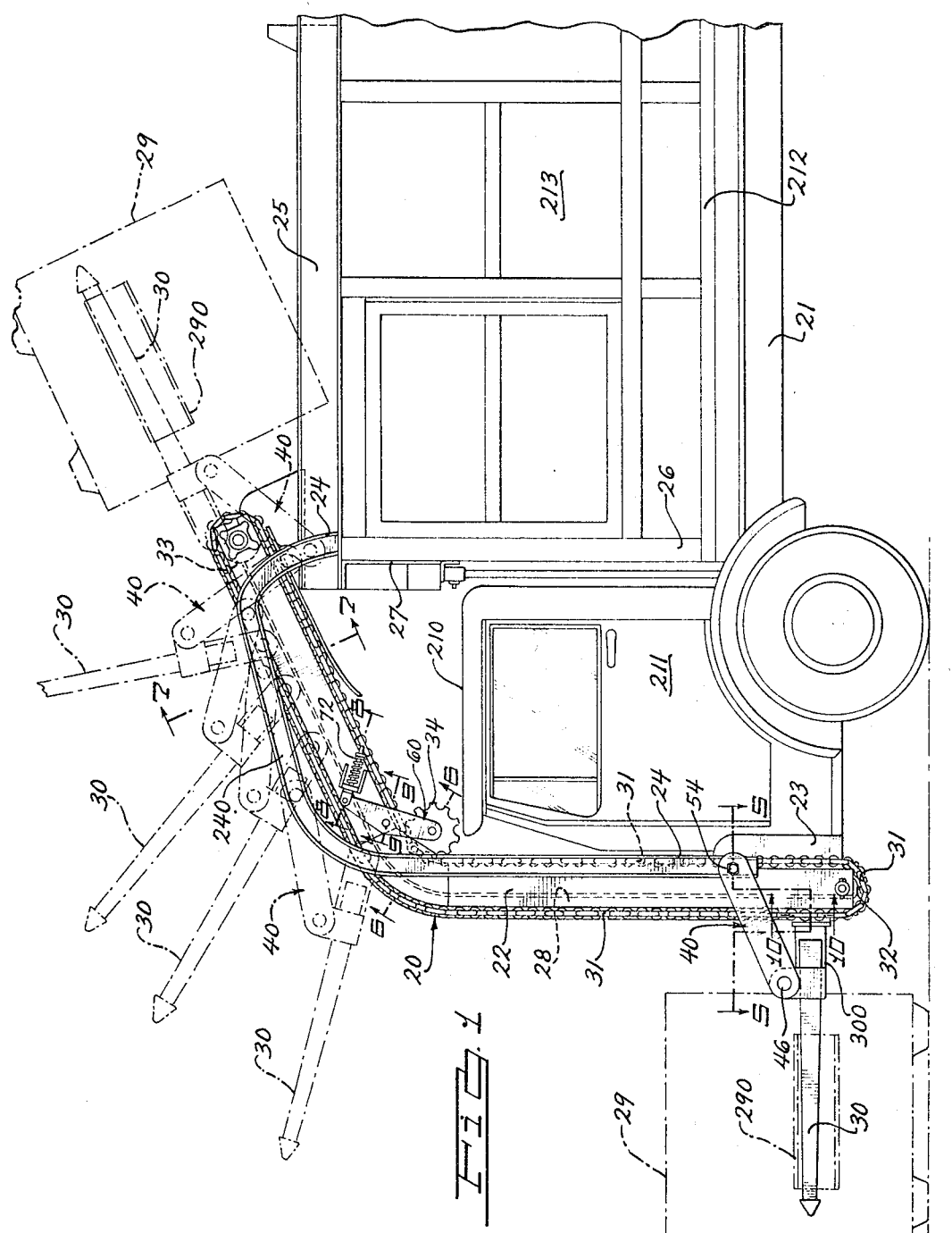

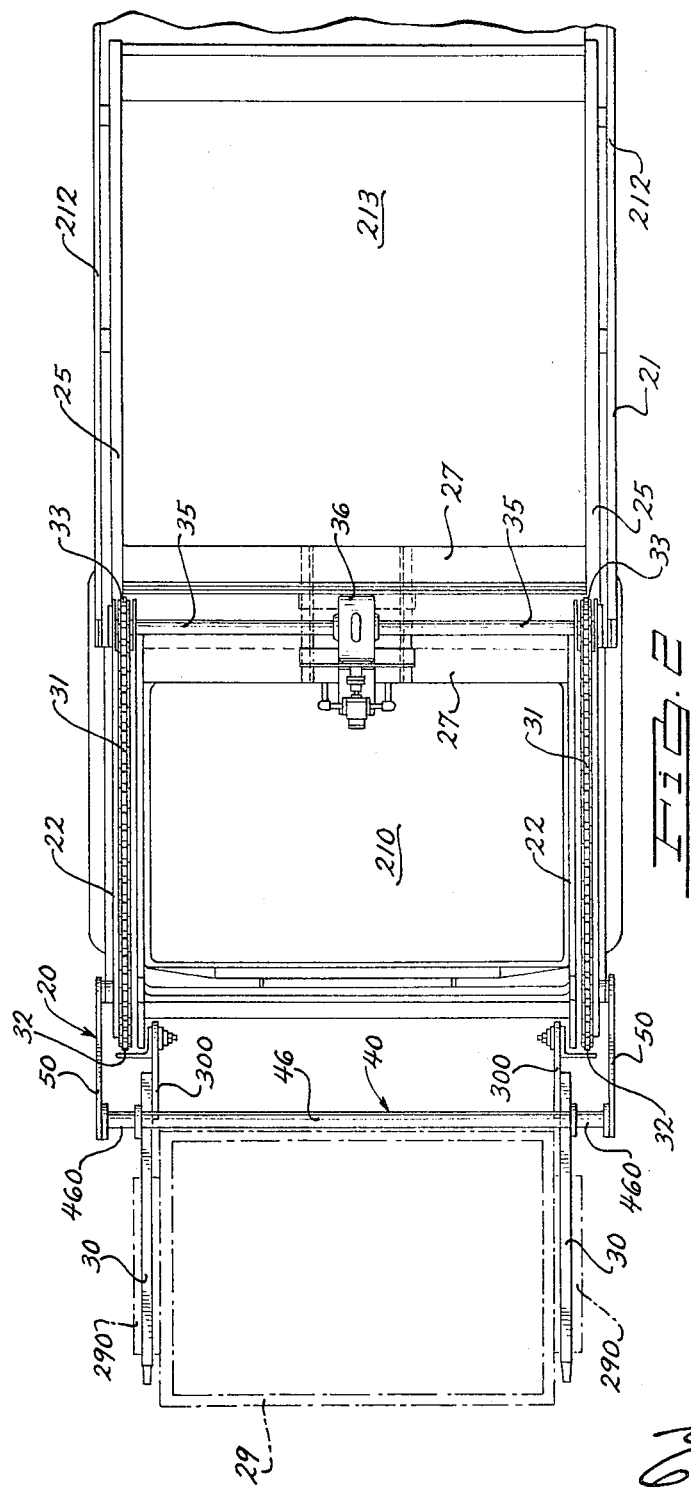

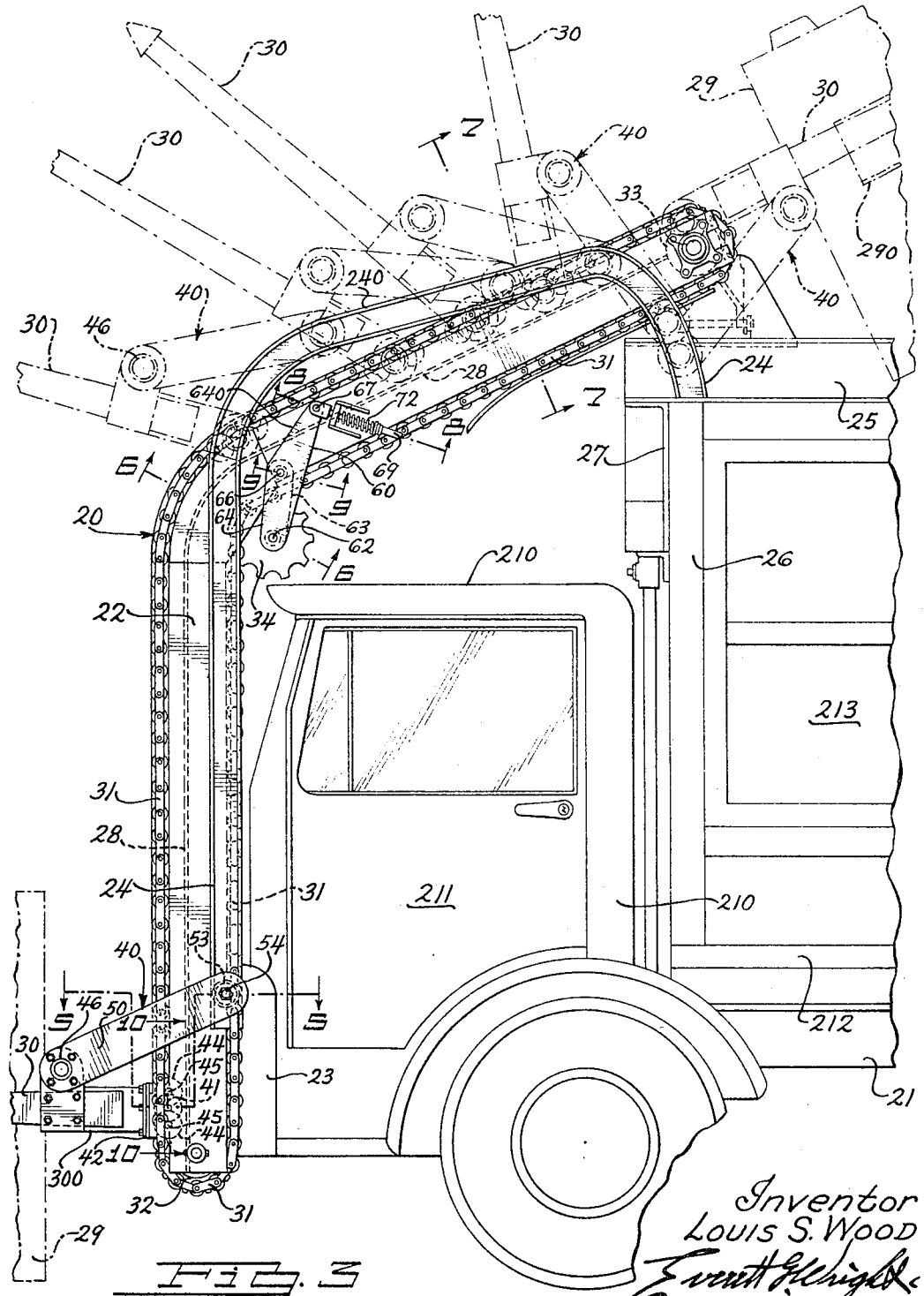

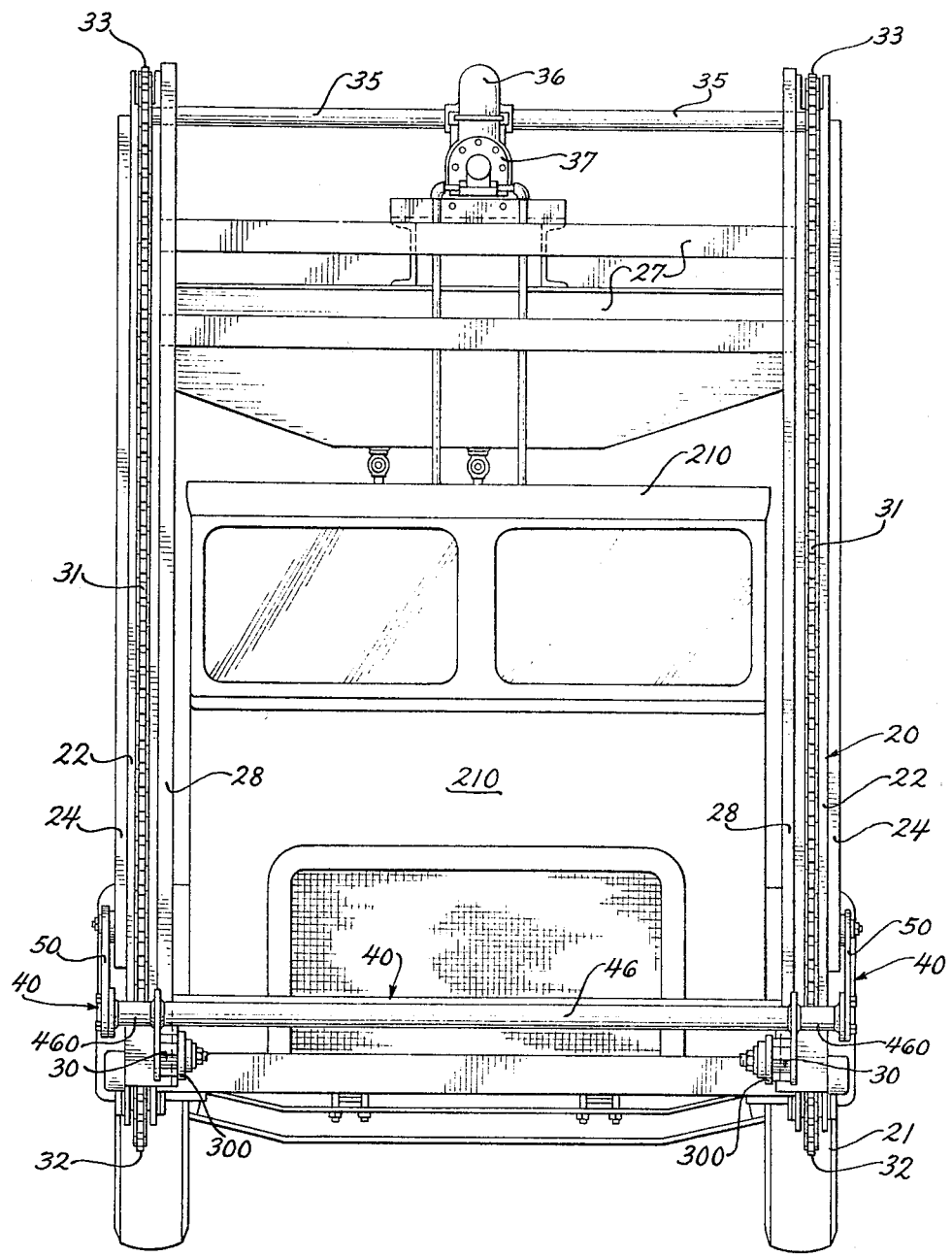

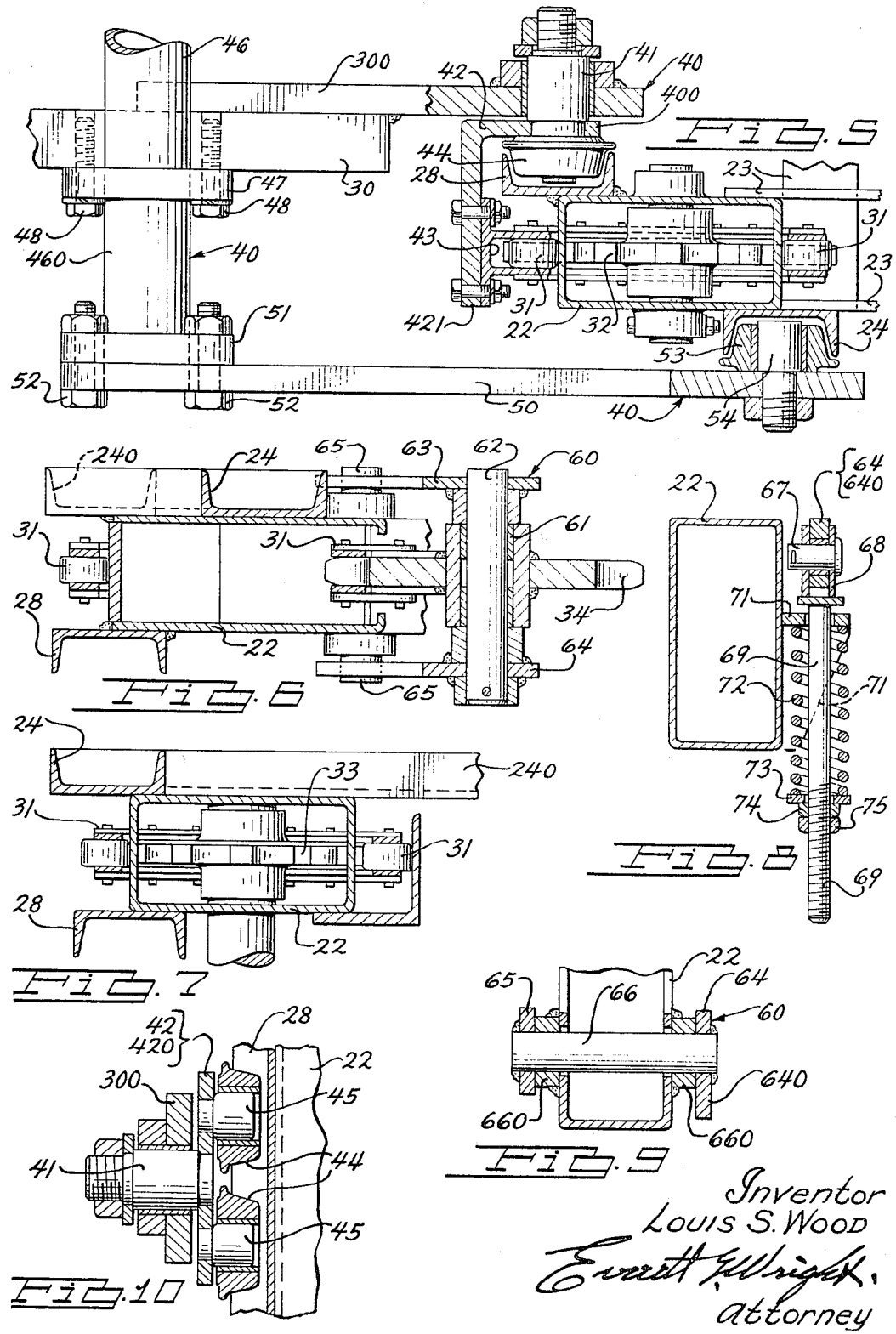

3,282,453
FRONT END LOADERS FOR REFUSE TRUCKS
AND THE LIKE
Louis S. Wood, 1605 Grant Blvd., Findlay, Ohio
Filed Apr. 15, 1965, Ser. No. 448,402
5 Claims. (Cl. 214—302)

This invention relates to front end loaders for refuse trucks and the like of the type that engages and picks up a load box or refuse container, elevates it to a dumping position over the cab of the truck, turns the load box over to dump the contents thereof into the truck body, and returns the said load box to the original position assumed by it prior to being engaged and emptied by the said loader.

The primary object of the instant invention is to provide an improved loader of the aforesaid type for dump trucks which is inexpensive to manufacture and is readily mountable on the truck chassis extending upwardly and over the cab of the truck and terminating adjacent the forward end of a dump body carried by the truck chassis rearwardly of the cab of the dump truck, all without interference with access to the truck cab and with a minimum obstruction of the view of the driver from the truck cab.

A further object of the invention is to provide an improved front end loader for dump trucks employing simply constructed rugged mechanism capable of picking up load boxes and dumping the contents thereof into the truck dump body, the said loader mechanism preferably being powered from the same source of hydraulic fluid pressure that powers the compacting and dumping mechanism of the dump body.

Other objects of the invention will become apparent by reference to the following detailed description taken in connection with the accompanying drawings, in which:

FIG. 1 is a fragmentary side elevational view of the forward end of typical self-dumping truck rear dumping refuse dump truck on which is mounted a front end refuse loader embodying the invention.

FIG. 2 is a top plan view of the construction shown in FIG. 1.

FIG. 3 is an enlarged fragmentary side elevational view similar to FIG. 1 showing the several positions assumed by the dumping mechanism during the lift and dump cycle of the front end refuse loader mechanism preferably employed.

FIG. 4 is an enlarged front elevational view of the front end loader equipped dump truck shown in FIG. 1.

FIG. 5 is an enlarged horizontal sectional view of the front end loader mechanism taken substantially on the line 5—5 of FIGS. 1 and 3 at the left front end of the refuse truck, the loader mechanism on the opposite side being the same except opposite hand.

FIG. 6 is an enlarged sectional view taken on the line 6—6 of FIGS. 1 and 3.

FIG. 7 is an enlarged sectional view taken on the line 7—7 of FIGS. 1 and 3.

FIG. 8 is an enlarged sectional view taken on the line 8—8 of FIGS. 1 and 3.

FIG. 9 is an enlarged sectional view taken on the line 9—9 of FIGS. 1 and 3.

FIG. 10 is an enlarged vertical sectional view taken on the line 10—10 of FIGS. 1 and 3.

Referring now to the drawings wherein like reference characters refer to like and corresponding parts throughout the several views, the particular front end loader 20 of the invention for use on a refuse dump truck 21 includes an over-the-cab frame preferably consisting of a pair of vertically and rearwardly disposed track supporting hollow box girders 22 preferably built up from structural plate. Each said box girder 22 extends vertically from and is supported at its lower end on a suitable bracket 23 connected to the front end of the truck chassis (not shown). Each said hollow box girder 22 has welded to its laterally outer side an outer channel skip track 24. The upper end of each said skip track 24 is connected to a stationary longitudinal truck body frame member 25 supported on a suitable stanchion 26 located to the rear and extending above the cab 210 of the said truck 21. Cross framing 27, and other suitable framing (not shown), makes the hollow box girders 22 and outer channel skip track 24 a rigid structure supported on the dump truck chassis and bridging the cab 210 of the dump truck body 213, all without interference with the normal operation of the dumping of the dumpable load carrying compartment 213 of the said dump truck body 212.

Inasmuch as the dump truck 21 per se is not a part of the invention, details thereof need not be shown or described. However, front end loaders 20 of the invention when mounted on any type of a dump truck are always supported on suitable framing that does not interfere with access to the truck cab 210 through side doors 211 thereof or with other conventional dump truck body and chassis elements peculiar to the particular dump truck equipped with a front end loader of the invention.

Each box girder 22 has welded to its laterally inner side an inner channel skip track 28. The said inner channel skip track 28 precisely follows and is parallel to the said box girder 22 throughout its entire length, whereas the outer channel skip track 24 is disposed parallel to the vertical portion of the box girder 22 and then deviates therefrom in a relatively flat arch shaped path 240 to cause a load box 29 carried by the loader arms 30 of the skip 40 to travel over the cab 210 of the dump truck body 212, dump its load into the dumpable load carrying compartment 213 thereof, and then return the said load box 29 to its normal position sitting on the ground or suitable platform, all as hereinafter more fully described.

Running along and on the forwardly and rearwardly disposed faces of each hollow box girder 22 is a continuous roller type power chain 31 which is mounted on a lower idler sprocket 32 and an upper power sprocket 33 with an intermediate takeup idler sprocket 34 preferably spring urged to the proper position to assure that the power chain 31 follows the rearwardly sloping and vertical rear side of the box girder 22. The upper power sprocket 33 at the upper end of each box girder 22 is mounted on and keyed to a cross shaft 35 which is splined to and driven by a slow speed shaft of a speed reducer 36 preferably driven by a reversible hydraulic motor 37 through suitable conventional controls (not shown) permitting it to be started, stopped and reversed from the cab 210 of the dump truck 21. Hydraulic powering of front end loaders of the invention is preferred not only because of minute control of the movement of the power chains 31 but because of the economy involved in employing the same source of hydraulic fluid pressure normally used in conventional dump body compacting and dumping mechanisms with which a dump truck 21 is generally equipped. Since conventional hydraulically powered dump truck compacting and dumping mechanisms are not a part of the instant invention, none have been shown or described herein.

The skip 40 consists of a pair of forwardly disposed laterally spaced loader arms 30, each of which is pivoted by a mounting plate 300 welded thereto on a transverse pivot 41 mounted through one leg 420 a connector angle 42, the other leg 421 of the said connector angle 42 being connected to a U-shaped clip 43 to the power flight of a power chain 31. Closely spaced double trunnions 44 are mounted by transverse pivots 45 on the said one leg 420 of the connector angle 42 and extend therefrom into the inner channel skip track 28, all as best shown in FIGS. 5 and 10.

The two loader arms 30 of the skip 40 are fixedly connected laterally together by such means as a tubular spacer bar 46 and a connecter plate 47 fixed to the said spacer bar 46 which is secured by studs 48 to each of the said loader arms 30. This properly spaces the said loader arms 30 laterally at a point forwardly of the double trunnions 44 and the inner channel skip track 28.

The two loader arms 30 of the skip 40 are fixedly connected laterally together by such means as a tubular spacer bar 46 and a connector plate 47 fixed to the said spacer bar 46 which is secured by studs 48 to each of the said loader arms 30. This properly spaces the said loader arms 30 laterally at a point forwardly of the double trunnions 44 and the inner channel skip track 28.

The said tubular spacer bar 46 extends laterally outwardly at 460 from said loader arms 30, and has fixedly secured to each of the outer ends thereof a link arm 50 employing a connector plate 51 and bolts 52 for the purpose. The said link arms 50 extend upwardly and rearwardly from the lateral outer ends 460 of said tubular spacer element 46, and each said link arm 47 has a single trunnion 53 mounted on a laterally inwardly extending trunnion shaft 54 located at the upper end thereof. The said single trunnion 53 at the upper end of each link arm 50 rides in the outer channel skip track 24 adjacent each said link arm 47 as the skip 40 is moved upwardly and downwardly along the inner channel skip tracks 28 by the power chain 31 under control of the operator of a refuse dump truck 21 equipped with a front end loader 20 of the invention. The control preferably consists of a conventional reversible flow-no flow hydraulic control valve (not shown) which applies hydraulic fluid under pressure from a suitable source to the reversible hydraulic motor 37.

FIGS. 6, 8 and 9 indicate one type of a spring loaded pivotal mounting 60 of the intermediate takeup idler sprocket 34 which is mounted rearwardly of each hollow box girder 22 at approximately the juncture of the vertical and diagonally rearwardly disposed portions thereof. The said intermediate takeup idler sprocket 34 is journaled at 61 on a sprocket shaft 62 supported on the lower end of levers 63 and 64 journaled on stub shafts 65 mounted on the sides of each box girder 22, see FIG. 6. As best shown in FIG. 9, the said levers 63 and 64 are mounted on a pivot shaft 66 journaled through bearings 660 fixed on each box girder 22, and the outer lever 64 extends upwardly beyond the pivot shaft 66 as indicated by the numerals 640.

The upper free end 640 of the outer lever 64 is pin connected by a suitable pin 67 to a yoke 68 welded on one end of a tensioning rod 69 which extends freely through a suitable bracket 71 welded to the outer side of each box girder 22. A compression spring 72 is disposed around the tensioning rod 69 and is adjustably compressed against the bracket 72 by a spring seat washer 73 and a compression adjusting nut 74 threaded on said tensioning rod 69 and held in place by a lock nut 75, see FIG. 8.

With the foregoing or other spring loaded pivotal mounting 60 of each idler takeup sprocket 34, the nonloaded run of each of the power chains 31 forward of the hollow box girders 22 is maintained in its proper location in substantial contact therewith.

The load boxes 29 which are picked up and emptied by a front end loader of the invention have on each side thereof a suitably located elongated hollow bracket 290 or an equivalent structure. The said hollow brackets 290 receive the loader arms 30 of the skip 40 as a refuse dump truck 21 equipped with a front end loader 20 of the invention is driven forwardly to telescope the said loader arms 30 thereinto as shown in FIGS. 1 and 2. Once the loader arms 30 are properly telescoped within the brackets 290 of a load box 29, the driver of the refuse dump trunk actuates the front end loader skip mechanism whereupon the load box 29 is lifted, turned over and dumped as indicated in FIG. 1. Although not shown, suitable limit controls and valves are employed to limit either the upward dumping or the lower return travel of the skip 40, and, inasmuch as such limit controls are well known and conventional in the art, they not only need not be illustrated but need not be described in detail.

Although but a single embodiment of the invention has been disclosed and described herein, it is obvious that many changes may be made in the size, shape, arrangement and detail of the various elements of the invention, all without departing from the spirit and scope thereof as defined by the appended claims.

I claim:

1. A front end loader for raising, dumping and lowering refuse boxes into a truck having a wheeled chassis, a front end driver's cab and a load carrying body mounted on said chassis rearwardly of said cab, said front end loader comprising a loader frame fixedly mounted on said chassis and extending over said cab and the forward end of said truck body, said loader frame including a pair of laterally spaced vertically disposed girders bent diagonally upwardly and rearwardly over said cab to and in spaced relationship over the forward end of said truck body, a pair of channel shaped skip tracks mounted on each said girder, one skip track following the said girder throughout its entire length while the other skip track follows said girder along the vertical portion thereof and is spaced in a generally flat arch shaped form above the said upwardly and rearwardly portion of said girder, an endless power chain mounted on and supported by each girder along the entire length thereof with the power flight of said power chain disposed along the forwardly disposed face of said girder, a skip including a pair of loader arms each pivotally connected to double trunnions running in said one skip track and by a fixed arm to a single trunnion running in said other skip track at a point spaced above and laterally of said double trunnions, said fixed arms holding said loader arms and said double and single trunnions in right angular relationship to each other, means laterally spacing said trunnions of each loader arm in alignment with their skip tracks, means connecting each loader arm to said power flight of said power chain, and manually controlled hydraulic means moving said power chains in a selected direction whereby to lift said loader arms and a load box engaged thereby to and from a dumping position, the said loader arms turning over a load box carried thereby responsive to the double trunnions running along each said one skip track and said single trunnion running along said other skip track as said loader arms carrying said load box are raised by said power chains first vertically along said skip tracks and then upwardly and rearwardly beyond the vertical portion of said skip tracks.

2. A front end loader for loading refuse from refuse load boxes into a truck having a wheeled chassis, a front end driver's cab and a load carrying body mounted on said chassis rearwardly of said cab, said front end loader comprising a loader frame fixedly mounted on said chassis including a pair of laterally spaced girders extending upwardly from said chassis and diagonally rearwardly over said cab and the forward end of said load carrying body spaced therefrom, a laterally outer and a laterally inner channel skip track fixed to and extending along each said girder with the laterally outer skip track taking a relatively flat arch shaped path above the diagonally rearwardly disposed portion of its supporting girder, and endless power chain mounted on and supported by each said girder with the power flight thereof running along the forwardly disposed face of its supporting girder, a skip consisting of a pair of forwardly disposed laterally spaced loader arms engageable with a refuse loader box, double trunnion means pivotally connected to each said loader arm running in each said laterally inner skip track, means connecting each said double trunnion means to the power flight of one of said endless power chains, a link arm extending rigidly rearwardly and upwardly from each said loader arm including a trunnion journaled at the rearward end of said link arm running in the adjacent outer skip track, means engaging said loader arms and said link arms laterally spacing the same whereby to assure that the double trunnion means and the single trunnion means travel in their respective inner and outer skip tracks, the relationship of the outer skip tracks to their supporting girders and the inner skip tracks running along said supporting girders at the upwardly and rearwardly disposed portion of said girders being such as to cause said loader arms to turn over and dump the contents of a load box carried thereby into said load carrying body as said skip is moved by said power chains first upwardly and then rearwardly along said skip tracks, and manually controlled hydraulic motor means for moving said power chains in unison in opposite directions to raise and lower said skip whereby to dump and return a refuse load box engaged by said skip arms.

3. A front end loader for loading refuse from refuse load boxes into a truck having a wheeled chassis, a front end driver's cab and a load carrying body mounted on said chassis rearwardly of said cab, said front end loader comprising a loader frame mounted in fixed relationship on said chassis extending over said cab and the forward end of said load carrying body, said loader frame including a pair of laterally spaced vertically disposed box girders, each said box girder having its upper portion extending diagonally rearwardly over said cab and supported at its lower end on said chassis and its upper end on said loader frame, a laterally outer channel skip track and a laterally inner channel skip track fixed to and extending along each said box girder, the said laterally outer skip track taking a generally arch shaped path above the diagonally rearwardly disposed upper portion of its supporting box girder, an endless power chain running along the forwardly and rearwardly disposed faces of each said box girder and over a lower idler sprocket and upper power sprocket located at opposite ends of each said box girder, manually controlled hydraulic power means moving said power chains in unison in opposite directions, a skip consisting of a pair of forwardly disposed loader arms engagable with a refuse load box, one said loader arm being mounted on each said power chain and disposed in lateral parallel relationship with respect to each other, said skip including a double trunnion means pivotally connected to each said loader arm running in each said laterally inner channel skip track, means connecting each said double trunnion means to one of said endless power chains, a tubular cross member including means rigidly connecting the same to each said loader arm at a point forwardly of said inner channel skip track, a pair of link arms rigidly connected to said tubular cross member extending rearwardly and upwardly therefrom, and a single trunnion journaled on the rearward end of each said link arm running in an outer skip track, said link arm and said loader arm always maintaining their fixed angular relationship with respect to each other as said double trunnions are moved by said power chains along said inner channel skip tracks guided by said single trunnions moving along said outer channel skip tracks, the relationship of the outer skip tracks to said box girders and said inner skip tracks therealong being such as to cause said loader arms to raise upwardly and turn over whereby to dump the contents of a dump box carried thereby into said load carrying body as said skip is moved by said power chains upwardly and diagonally rearwardly along said inner skip tracks.

4. A front end loader for loading refuse from refuse load boxes into trucks having a wheeled chassis, a front end driver's cab and a load carrying body mounted on said chassis rearwardly of said cab, said front end loader comprising a loader frame mounted in fixed relationship on said chassis extending over said cab and the forward end of said load carrying body, said loader frame including a pair of laterally spaced vertically disposed girders, each said girder having its upper portion extending diagonally rearwardly over said cab and supported at its lower end on said chassis and its upper end on said loader frame, a laterally outer channel skip track and a laterally inner channel skip track fixed to and extending along each said girder, the said laterally outer skip track taking a generally arch shaped path above the diagonally rearwardly disposed upper portion of its supporting girder, an endless power chain running along the forwardly and rearwardly disposed faces of each said girder and over a lower idler sprocket and upper power sprocket located at opposite ends of each said girder, manually controlled hydraulic power means moving said power chains in unison in opposite directions, a skip consisting of a pair of forwardly disposed loader arms engagable with a refuse load box, one said loader arm being mounted on each said power chain and disposed in lateral parallel relationship with respect to each other, said skip including a double trunnion means pivotally connected at a point between said trunnions to each said loader arm, said double trunnions running in each said laterally inner channel skip track, means connecting each said double trunnion means to one of said endless power chains, a tubular cross member including means rigidly connecting the same to each said loader arm at a point forwardly of said inner skip track, a pair of link arms rigidly connected to said tubular cross member extending rearwardly and upwardly therefrom, and a single trunnion journaled on the rearward end of each said link arm running in an outer skip track, said link arm and said loader arm always maintaining their fixed angular relationship with respect to each other as said double trunnions are moved by said power chains along said inner channel skip tracks guided by said single trunnions moving along said outer channel skip tracks, the relationship of the outer skip tracks to said girders and said inner skip tracks extending therealong being such as to cause said loader arms to turn over and dump the contents of a load box carried thereby into said load carrying body as said skip is moved by said power chains upwardly and diagonally rearwardly along said skip tracks.

5. A front end loader for loading refuse trucks having a wheeled chassis, a front end driver's cab, and a rear load carrying body, a loader frame consisting of a pair of laterally spaced girders each including a substantially vertical section extending upwardly from the forward end of said chassis and a diagonally upwardly and rearwardly disposed section spaced over said cab and connected to the forward portion of said load carrying body, a laterally outer channel skip track fixed to and extending along the vertical section of each said girder and taking a generally arch shaped path above the diagonally and rearwardly disposed upper section of said girder with its outer end curved downwardly past and fixed to the outer end portion of said girder, a laterally inner channel skip track fixed to and extending along substantially the entire length of each said girder disposed longitudinally forward of said outer channel skip track along the said vertical section of said girder, an endless power chain means running along each said girder including manually controlled hydraulic power means moving said power chains in unison in either of opposite directions, a skip consisting of a pair of parallel forwardly disposed laterally spaced loader arms engageable with a refuse loader box, and including a double roller trunnion means pivotally connected to each said loader arm running in each said inner channel skip track, a link arm rigidly extending in a fixed angular relationship upwardly and rearwardly from each said loader arm including at the end thereof a single roller trunnion means running in each said outer channel skip track, means connecting one said power chain to each said double trunnion means at its pivotal connection to a said loader arm, said link arm and said loader arm always maintaining their fixed angular relationship with respect to each other as said double trunnions are moved by said power chains along said inner skip channel tracks guided by said single trunnions moving along said outer channel skip tracks, the relationship of the outer skip tracks to said box girders and said inner skip tracks therealong being such as to cause said loader arms to first raise upwardly and then turn over gradually and then substantially completely whereby to dump the contents of a dump box carried thereby into said load carrying body as said skip is moved by said power chains upwardly and diagonally rearwardly along said inner skip tracks.

References Cited by the Examiner

UNITED STATES PATENTS 2,788,135 4/1957 Girotti _____ 214—75
3,012,813 12/1961 Reese _____ 214—75 X
3,174,636 3/1965 Dempster et al. _____ 214—302

HUGO O. SCHULZ, *Primary Examiner.*